March 2, 1965 W. L. BROWN 3,171,911
DIRECTION SIGNALING APPARATUS WITH SPACE SAVING
CONTACT AND SWITCHING ELEMENT ARRANGEMENT
Filed Sept. 7, 1961
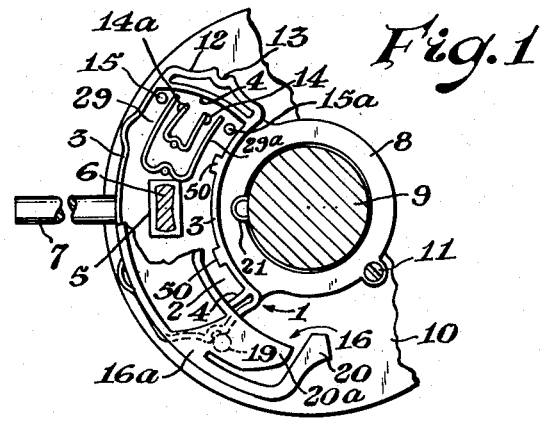
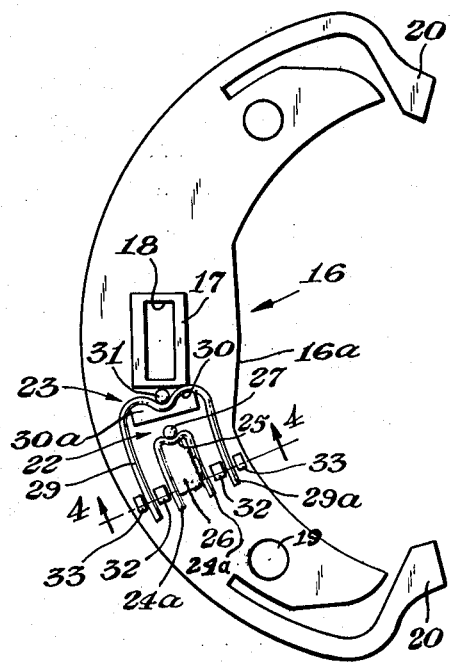
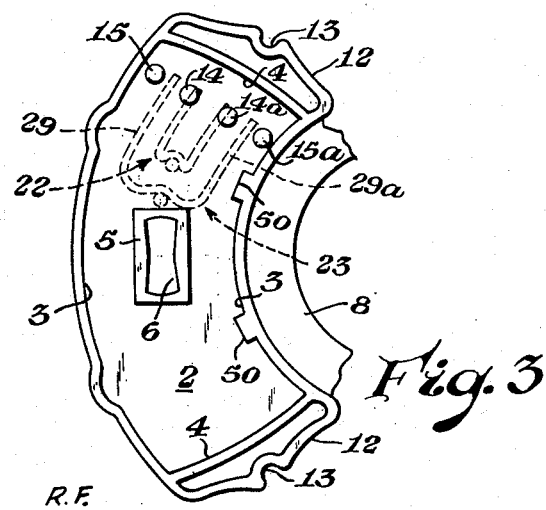
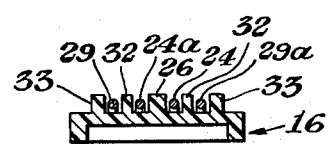
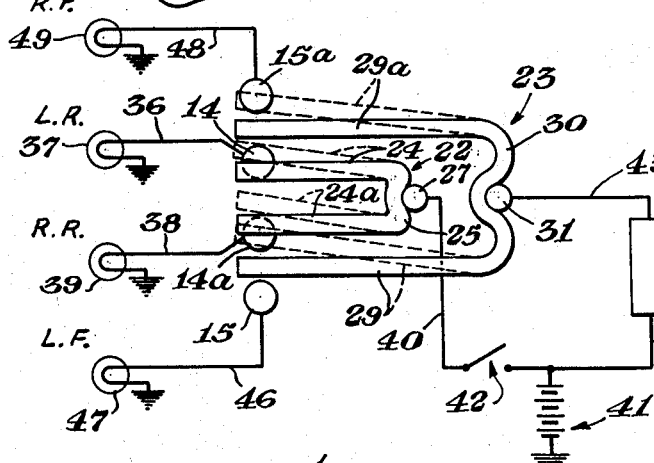
INVENTOR.
William L. Brown
BY
Learman, Learman & McCulloch
ATTORNEYS United States Patent Office 3,171,911
Patented Mar. 2, 1965

3,171,911
DIRECTION SIGNALING APPARATUS WITH SPACE SAVING CONTACT AND SWITCHING ELEMENT ARRANGEMENT
William L. Brown, Garden City, Mich., assignor to Boyne Products, Inc., Boyne City, Mich., a corporation of Michigan
Filed Sept. 7, 1961, Ser. No. 136,670
6 Claims. (Cl. 200—61.34)

This invention relates to direction signaling apparatus for use on motor vehicles and more particularly to semi-automatic signaling apparatus of the kind adapted for manual actuation to indicate either a left hand or a right hand turn and which is restored automatically to its neutral position upon the completion of the turn.

Apparatus of the general class to which the invention relates currently is in wide usage in the automotive field and conventionally includes mechanism for effecting flashing of front and rear lights at one side or the other of a vehicle to indicate either a left hand or a right hand turn. More recently it has been proposed to incorporate in the direction signaling apparatus several different kinds of auxiliary devices, any and all of which may activated or deactivated upon the operation of the turn signaling apparatus. Many of the proposed auxiliary devices require rather intricate electrical circuitry and, consequently, a substantial amount of space for the accommodation of contacts, wires, switching members, and the like.

The amount of space available for auxiliary circuitry in direction signal devices is limited rather severely by the restricted confines of the steering shaft housings on which most of the turn signal devices are mounted. Moreover, the movements of the movable parts of such devices necessarily must be limited to avoid inconvenience in the operation of the direction signals.

It is an object of this invention to provide direction signaling apparatus which need be no larger than apparatus of the kind heretofore in use and yet which provides ample space both for the turn signal mechanism and for whatever auxiliary circuitry is desired.

A further object of the invention is to provide apparatus for actuating direction signals and other devices, but without adversely affecting the operation of the direction signal operating means.

Another object of the invention is to provide apparatus of the kind referred to in which the electrically conductive parts of the apparatus are inherently maintained bright and clean as a result of normal operation of the apparatus.

A further object of the invention is to provide direction combination signaling apparatus having sufficient space to accommodate auxiliary circuit means and yet which occupies no greater space than direction signaling apparatus previously has occupied.

Other objects and advantages of the invention will be pointed out specifically or will become apparent from the following description when it is considered in conjunction with the appended claims and the accompanying drawing, in which:

FIGURE 1 is a fragmentary view, partly in plan and partly in section, of apparatus constructed in accordance with the invention and assembled adjacent the steering shaft of a conventional automobile;

FIGURE 2 is an enlarged, bottom plan view of an actuator member and switching apparatus forming part of the invention;

FIGURE 3 is an enlarged, fragmentary, top plan view of a portion of the apparatus shown in FIGURE 1, with the switching apparatus shown in FIGURE 2 illustrated in phantom lines;

FIGURE 4 is a sectional view taken on the line 4—4 of FIGURE 2; and

FIGURE 5 is a schematic wiring diagram.

Apparatus constructed in accordance with the invention has many characteristics which are similar to the constructions disclosed in application Serial No. 797,266, now Patent No. 2,999,911 and in application Serial No. 131,243 filed August 14, 1961, and the apparatus herein disclosed is an improvement over the construction illustrated in those applications.

The illustrative embodiment of the invention comprises an arcuate switch casing member 1 that preferably is molded from a suitable nonconductive material such as nylon and has a base 2 defined by upstanding side and end walls 3 and 4, respectively. Extending upwardly from the base of the casing is a boss 5 that is adapted rockably to receive an operating shaft 6 to which is connected an operating lever 7. The casing 1 may include an integral, annular flange 8 that is adapted to receive a rotatable steering shaft 9, the flange and the casing being fixed to a support member or housing 10 by one or more screws 11. At each end of the casing 1 is a flexible rib 12 having detent surfaces 13 formed therein for a purpose which presently will be explained. Adjacent one end of the casing 1 are mounted two sets of fixed, electrically conductive contact elements 14, 14a and 15, 15a. The contacts 14, 14a are inboard of the contacts 15, 15a.

The apparatus includes an actuating member 16 having an arcuate body 16a that preferably is molded from a nonconductive material such as nylon and having a centrally located hub 17 provided with a rectangular opening 18 therein of such size as snugly to receive the operating shaft 6, the arrangement being such that rocking movement imparted to the shaft 6 will be transmitted to the actuating member 16, and vice versa. The curvature of the actuating member 16 conforms substantially to the curvature of the casing 1. The body 16a includes, adjacent its opposite ends, a pair of detents or posts 19 that engage the respective ribs 12 of the casing 1 and cooperate with the detent surfaces on the latter so as yieldably to maintain the actuating member either in its neutral position, as is indicated in FIGURE 1, or in either of its operating positions located at opposite sides of the neutral position.

The actuating member 16 includes a pair of integral, yieldable fingers 20 which project beyond the ends of the body and are adapted, in the neutral position of the actuating member, to lie clear of the path of rotation of a cam 21 that is mounted on the rotatable steering shaft 9. Opposite ends of the body 16a are equipped with integral abutments 20a that lie adjacent the fingers 20. Rocking of the actuating member 16 to one or the other of its operating positions, however, will shift or project one or the other of the fingers 20 into the path of rotation of the cam 21, whereupon rotation of the steering shaft in a direction to complete the turn will effect engagement between the cam and the projected finger so as to force the projected finger against its associated abutment 20a and move the actuating member to its neutral position.

Mounted on the inner surface of the actuating member 16 is a pair of generally elongated U-shaped switching members 22 and 23. The member 22 includes a pair of substantially parallel arms or legs 24, 24a that are substantially circular in cross-section and which are joined together at corresponding ends by an arcuate web 25. The legs 24, 24a are maintained apart by a block 26 forming an integral part of the body of the member 16 and having a curved surface corresponding to the curvature of the web 25 and in engagement with the latter. Spaced from the block 26 a distance corresponding to the thickness of the web 25 and fixed in the body 16a is an electrically conductive post 27 against which the web 25 of the member 22 is securely held by the block 26.

The contact member 23 includes a pair of generally parallel legs 29, 29a joined together at corresponding ends by a curved web 30. An electrically conductive post 31 is fixed in the body of the member 16 adjacent the hub 17, and the web 30 of the member 23 is securely held against the post 31 by a block 30a. The legs 29, 29a of the member 23 are spaced apart from the legs of the member 22 by studs 32 integrally formed on the member 16 and which lie between the adjacent pairs of legs. Preferably, other studs 33 are integrally formed on the body 16 outwardly of the legs 29, 29a so as to maintain the spacing between the legs 29, 29a and to cooperate with the parts 26 and 32 in effecting conjoint and uniform movement of the switch members 22 and 23 in response to rocking of the actuating member.

When the actuating member 16 is mounted on the switch casing 1 in the manner indicated in FIGURE 1, all of the arms of the switch members 22 and 23 will extend from adjacent the rocking axis of the actuator 16 toward that end of the casing 1 where the contact elements 14, 14a and 15, 15a are mounted. The contact members 14–15a preferably comprise crown head rivets extending a substantial distance above the level of the base 2 so as to assure a firm and wiping contact thereof by the respective arms of the switching members 22 and 23. To compensate for the elevation of the contact elements above the level of the casing base 2, the arms of the respective switch members 22 and 23 are formed of a springy material such as beryllium copper alloy and are inclined away from the body of the member 16 as is indicated in FIGURE 4.

The contact 14 may be connected by a wire 36 to ground through a left rear tail lamp 37 and the contact 14a is connected by a wire 38 to ground through a right rear tail lamp 39, the lamps 37 and 39 forming part of the conventional lighting system of an automotive vehicle. The arms 24, 24a are so related to the contacts 14, 14a as to be in engagement therewith when the actuating member is in its neutral position. The contact post 27 is connected by a wire 40 to one terminal of a battery 41, the other terminal of the battery being grounded. Mounted in the line 40 is a normally open switch 42 of conventional construction which is adapted to be closed upon the application of the vehicle's brakes, whereupon energy may be supplied from the battery 41 through the contact post 27, through the arms 24, 24a, and through the contacts 14, 14a, to the lamps 37 and 39 so as to cause the latter to be illuminated to indicate the application of a vehicle's brakes.

The contact post 31 that engages the switch 23 is connected by a wire 43 to one terminal of a conventional flasher 44, the other terminal of which is connected by a wire 45 to the battery 41. The contact 15 is connected by a wire 46 to ground through a lamp 47 mounted at the left front of the vehicle, and the contact 15a is connected by a wire 48 to ground through a similar lamp 49 mounted at the right front of the vehicle.

When the actuating member 16 is in its neutral position, the arms 29, 29a of the contact member 23 are located between the contacts of the sets of contacts mounted in the casing, so as to be free from engagement of any of those contacts. Consequently, no circuit is completed from the battery through the contact switch member 23 to any of the vehicle's lamps.

As is best shown in FIGURE 5, the relative sizes and locations of the switch arms 24, 24a and the contacts 14, 14a are such that, when the actuating member is in its neutral position, the arms 24, 24a of the switching member 22 engage only about half the surface of their respective contacts 14, 14a. Moreover, the arrangement of the arms 24, 24a and the contacts 14, 14a is such that the arms engage their associated contacts at the inboard sides of the latter. The relative sizes and arrangement of the arms 29, 29a and the fixed contacts are such that rocking movement of the actuating member in either direction will move the arms 29, 29a an amount to cause them to engage an adjacent fixed contact, as will be pointed out more fully hereinafter.

Upon rocking of the actuating member 16 clockwise, as viewed in FIGURE 1, to its right turn indicating position, the switches 22 and 23 will be shifted to the chain line positions shown in FIGURE 5. In these positions of the parts the arm 24a will be free of all of the fixed contacts, whereas the arm 24 will remain in engagement with the contact 14. The arm 29 of the switch member 23 engages the contact 14a and the arm 29a engages the contact 15a. In the right turn indicating positions of the parts, a circuit will be completed from the right front lamp 49 and the right rear lamp 39 via the arms 29a, 29 of the switching member 23 to the battery 41 through the flasher 44, so as to cause intermittent flashing of the lamps 49 and 39. As has been indicated, the arm 24 of the switch member 22 remains in engagement with contact 14 so that closing of the switch 42 will cause the left rear lamp 37 to glow steadily, even though the right rear lamp continues to flash.

Upon the completion of the turn, engagement between the cam 21 and the projected return finger 20 will cause the actuating member 16 to be returned to its neutral position, thereby restoring the switching parts to the positions shown in full lines in FIGURE 5.

The apparatus functions in substantially the same manner to indicate a left hand turn, with the exception that the switching parts carried by the actuating member 16 are rocked in a counterclockwise direction so as to effect engagement of the contacts 14, 14a, and by the arms 29a, 24a and 29, respectively, while permitting the contact 15a to remain electrically isolated.

For proper operation of the apparatus in the manner described, the diameter of each of the switch arms should be at least as great as the diameter of each of the contacts. Moreover, the extent of rocking movement of the actuating member from its neutral position to either of its operating positions must be limited to an amount such as to prevent disengagement between the arms 24, 24a and both of the contacts 14, 14a. The movements of the actuating member may be limited by providing integral stops 50 on the casing 1 in the path of movement of the member 16.

Apparatus constructed in accordance with the invention conforms substantially in size to the size of the turn signalling devices disclosed in the aforementioned applications and, accordingly, may be used interchangeably with the latter in those instances where it is desired to include auxiliary circuitry. Such circuitry may comprise electrically operated turning lamps, auxiliary turn signaling lamps, load stabilizing devices, or a host of other devices desirable to be operated upon turning of a vehicle. In the event such auxiliary circuitry is desired, one whole side of the switch casing and the actuating member are available for use to mount cooperative switch parts. There thus is provided ample room in the turn signaling apparatus for additional circuit elements without increasing the size of the turn signaling apparatus and without adversely effecting its operation. Moreover, the operation of the directing signaling apparatus effects a wiping action between the fixed and movable contacts, thereby maintaining those parts clean and bright.

The disclosed embodiment is representative of a presently preferred form of the invention, but is intended to be illustrative rather than definitive thereof. The invention is defined in the claims.

I claim:

1. Direction signaling apparatus comprising a support member; an arcuate actuating member pivotally mounted between its ends on said support for rocking movements about an axis and terminating at its opposite ends in integral return fingers; a plurality of spaced, electrically conductive contacts all of which are mounted on one of said members between said axis and one only of said ends of said actuating member; a number of elongated switching elements interposed wholly between said members and extending from adjacent said axis toward said contacts for engagement and disengagement with selected ones of said contacts; means reacting between said switching elements and the other member for effecting movements of said switching elements relative to said contacts upon rocking movements of said actuating member; and means for rocking said actuating member about said axis.

2. Apparatus as set forth in claim 1 wherein said contacts are mounted on said support member and said switching elements are mounted on said actuating member.

3. Direction signaling apparatus comprising a support member; and arcuate actuating member overlying said support member and terminating at its opposite ends in integral return fingers; means pivotally mounting said actuating member between its ends on said support member for rocking movements about an axis; a plurality of spaced, electrically conductive contacts all of which are mounted on said support member between said axis and one only of said ends of said actuating member; a number of spaced apart, elongated switching elements interposed between said members and extending from adjacent said axis toward said contacts for engagement and disengagement with selected ones of said contacts; means interposed between said elongated switching elements and supported by said actuating member for effecting movements of said switching elements relative to said contacts upon rocking movements of said actuating member; and means for rocking said actuating member about said axis.

4. Apparatus as set forth in claim 3 wherein said switching members are mounted on said actuating member.

5. Direction signaling apparatus comprising a support member; an arcuating member overlying said support member and terminating at its opposite ends in integral return fingers; means pivotally mounting said actuating member between its ends on said support member for rocking movements about an axis between said ends; a plurality of electrically conductive contacts mounted on said support member all to one side of said axis and being located between said axis and one of said ends of said actuating member; at least one generally U-shaped switching element interposed between said members and having substantially linear portions extending from adjacent said axis toward said contacts for engagement and disengagement with selected ones of said contacts; means fixed on said actuating member and interposed between said linear portions for effecting movements of the latter in response to rocking movements of said actuating member; and means for rocking said actuating member.

6. Direction signaling apparatus comprising a support member; an arcuate actuating member overlying said support member and terminating at its opposite ends in integral return fingers; means pivotally mounting said actuating member between its ends on said support member for rocking movements about an axis; a plurality of electrically conductive contacts mounted on said support member all to one side of said axis and being located between said axis and one of said ends of said actuating member; a pair of generally U-shaped switching elements interposed between said members and having substantially parallel, spaced apart linear portions extending from adjacent said axis toward said contacts for engagement and disengagement with selected ones of said contacts; means fixed on said actuating member and interposed between each of said linear portions for effecting movements of the latter in response to rocking movements of said actuating member; and means for rocking said actuating member.

References Cited in the file of this patent

UNITED STATES PATENTS

| 1,884,117 | Mortesen | Oct. 25, 1932 |
| 2,617,902 | Lincoln et al. | Nov. 11, 1952 |
| 2,972,663 | Zanichkowsky et al. | Feb. 21, 1961 |

FOREIGN PATENTS

| 1,060,454 | Germany | July 2, 1959 |